Dec. 30, 1947.  H. C. FOSTER  2,433,446
FILM SPLICE
Filed Oct. 30, 1943   2 Sheets-Sheet 1
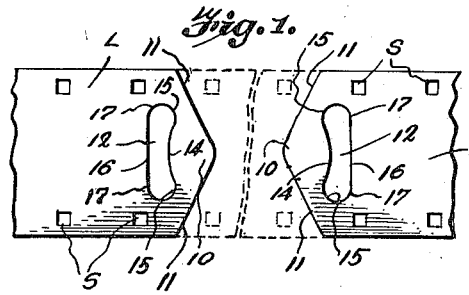
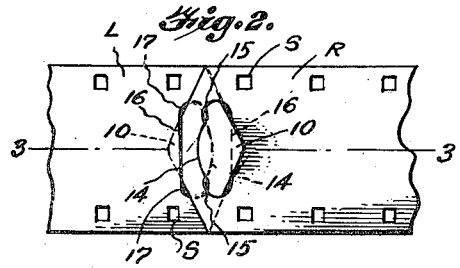
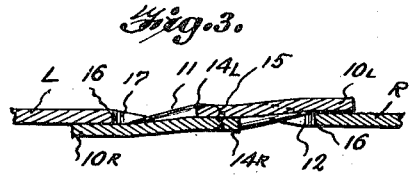
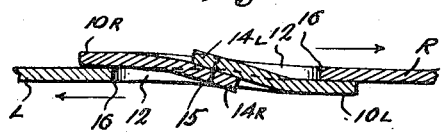
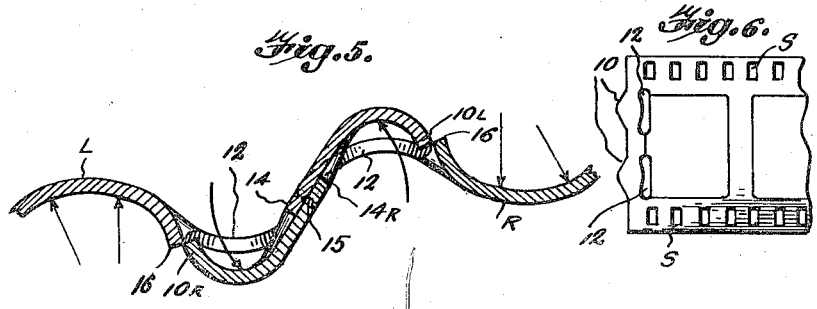
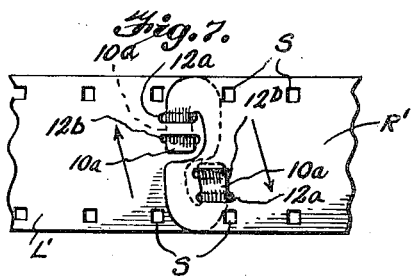
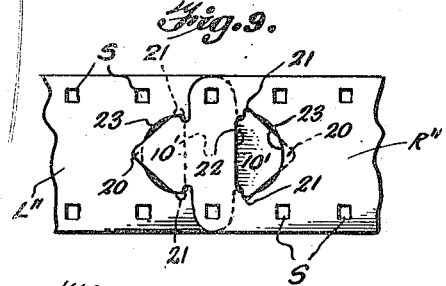
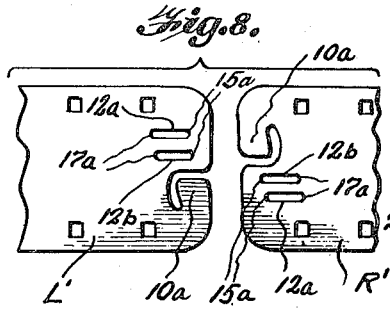
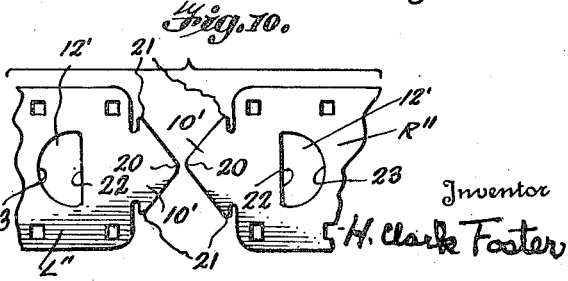
Inventor
H. Clark Foster
By Peck + Peck.
Attorneys

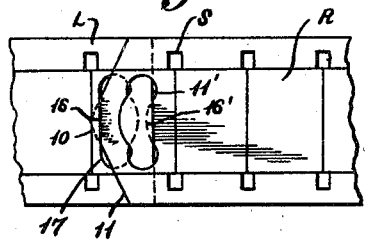
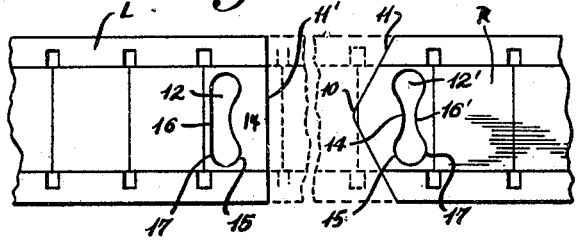
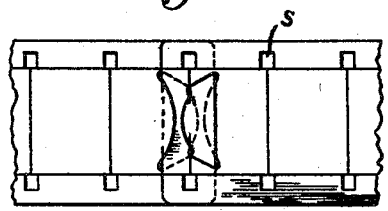
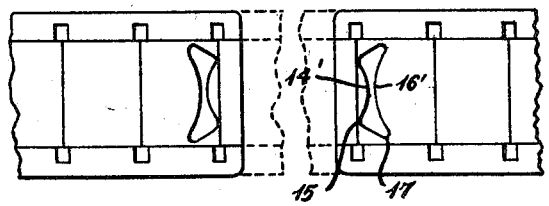
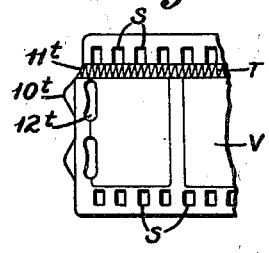
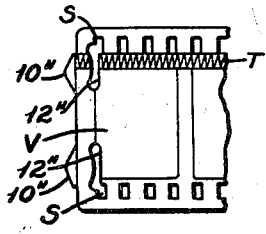

Patented Dec. 30, 1947

2,433,446

UNITED STATES PATENT OFFICE 2,433,446

FILM SPLICE

Harry Clark Foster, Alton, Ill.

Application October 30, 1943, Serial No. 508,283

15 Claims. (Cl. 88—19.5)

This invention relates to certain improvements in and relating to film splices; and the nature and objects of the invention will be readily recognized and understood by those skilled in the arts involved, in the light of the following detailed description and explanation of the preferred method of my invention and of the accompanying drawings illustrating what I at present consider to be the preferred embodiments or mechanical expressions of my invention from among various other embodiments, forms, designs, constructions and combinations of which my invention is capable within the broad spirit and scope thereof.

My invention is directed generally to the splicing or joining together of sections or lengths of cinema film, whether such cinema film is in the processing stages, either wet or dry, or is in its final finished form in condition for picture projection, although the invention appears to find its greatest utility in splicing sections or lengths of film in its finished form ready for projection. While the invention is primarily directed to the splicing of cinema and the like film, it is also intended for and may be useful in connection with the splicing of lengths or sections of other thin flexible materials.

In accordance with generally prevailing practices, cinema or moving picture film sections are spliced or joined together by various methods of which those customarily employed either involve the use of cement or some form of chemical treatment, or use of metal grommets, or tape and staples as the fastening means to attach the ends of the film sections together.

One characteristic common to film splices produced by these prevailing methods, is the formation of a permanent connection or splice joining the film sections, so that the joined and spliced sections cannot be detached or disengaged at the spliced location without breaking or severing the film and permanently destroying that particular splice or connection. Thereafter, if the broken or severed film is to be rejoined or reconnected, it is necessary to sever and remove the damaged splice portions of the film and then form a completely new connection or splice between the ends of the film sections from which the damaged splice portions have been removed. This resplicing or rejoining operation causes the loss of a portion of the film to the extent of at least two or more picture "frames" when the film sections have again been rejoined or spliced.

In the formation of a splice or connection between the ends of film sections by the use of cement, the emulsion must first be tediously removed from an area of the film base in order that the cement will adhere properly to the film, and after the cement has been applied and the film ends are lapped, it is further necessary to hold such lapped and cemented ends together under pressure long enough for the cement to set and complete the splice. In addition to the time consumed in forming a cemented splice, the resulting splice of this type is not always dependable against failure in use, due to the frequent inadequate preparation of the film ends for cementing or to deficiency in the cement. Frequently with cemented splices too much cement is employed which results in a splice which unduly thickens the film at the splice and forms a hump in the film which will, when run through a picture projecting apparatus, cause uneven projection of pictures, and may even sometimes cause "loss of loop" and resulting damage to a film being run through the projection apparatus. Imperfect and weak cemented splices are also frequently formed due to overscraping and resulting weakening of the film in the preparation of a splice.

The use of fastening means, such as metal grommets or staples, for connecting or joining the ends of finished film after processing, is not usually feasible or practical because of difficulties encountered in using films so spliced in projecting apparatus. However, the use of metal fastening means, such as grommets or staples, for splicing film sections, is completely feasible and practical and is widely used for film during processing but due to the present scarcity of metals, the continued use of metal fastening means is practically prohibited and is no longer feasible under present conditions.

One of the primary objects of my present invention is to provide a form and type of splice for joining and connecting together sections or lengths of cinema film and similar thin flexible material, by so shaping and forming the ends of the sections of film to be joined or spliced together that such film ends may be quickly detachably interlocked together to form a tight splice without utilizing other material than that of the film itself, thereby eliminating the use of cement, fastening elements, or the necessity for any chemical treatment of the film ends to be joined.

A further object of the invention is to provide a film splice formed by detachably interlocking the ends of the film sections to be joined, in which the film section ends to be spliced are so shaped and formed as to provide interlocking and engaging members and edges, in which all of the members and edges of the interlocked and joined film ends in the completed splice are constrained to lie adjacent the film surface under all conditions of use of the film, thereby eliminating or substantially reducing the possibility of such edges being engaged by or catching on the film gate or other elements of a film projecting apparatus when the spliced film is run through such apparatus in either direction; and to further so design and arrange for the interlocking of the ends of the film sections to form the splice that the joined ends are disposed at opposite sides, respectively, of the spliced film in such a manner that the eccentric loading effect usually obtained when film ends are overlapped in offset relation to form a joint connecting film section, is substantially reduced.

Another object of the invention is to provide a film splice formed by mechanically interlocking and interengaging the ends of film sections to be connected together, which splice may be quickly formed and assembled by manual manipulation or by the use of suitable apparatus for such purpose; and further to provide such a splice that may be quickly detached, either manually or by suitable apparatus, to disengage and disconnect the joined film sections without destroying or impairing the splice forming ends of the disconnected sections, so that such ends may again be interlocked to form a splice and connect film sections together, thus providing a film splice which is of particular utility in the editing or rearranging of film sections or sequences, and a splice which will enable a film which breaks during projection to be quickly spliced with a minimum loss of film.

Another object of the invention is to so design and arrange such a film splice that the splice when completed by interlocking the ends of film sections together, will occupy as a maximum a space longitudinally or lengthwise of the film which will not exceed one picture "frame," thus reducing to a minimum the interruption to and interference with the picture projection by the film in operation in a projecting apparatus, as the duration of the projected image of the splice, with the splice confined to one picture "frame," will be of too short a duration in projection to be either noticeable or objectionable.

With the foregoing general objects, features and results in view, as well as certain others which will be readily recognized from the following detailed description, my invention consists of certain novel features in design and in construction and arrangement of elements and parts, all as will be hereinafter more fully referred to and specified.

Referring to the accompanying drawings, in which similar reference characters refer to corresponding parts and elements throughout the several figures thereof:

Fig. 1 is a plan view of the ends of sections of cinema film similarly shaped and perforated for assembly into interengaged and interlocked relation to form the completed splice of the invention connecting and joining the film sections together.

Fig. 2 is a top plan view of the film section ends of Fig. 1, interlocked and assembled to form the completed splice joining and connecting the film sections together.

Fig. 3 is an enlarged vertical, longitudinal section through the completed splice of Fig. 2, taken as on the line 3—3 of Fig. 2.

Fig. 4 is an enlarged vertical, longitudinal section of the splice of Fig. 2, but with the film section ends of Fig. 1 in partially interlocked and assembled position.

Fig. 5 is an enlarged vertical, longitudinal section illustrating the manipulation of the partially interlocked film section ends of Fig. 4, into completely interlocked and finally assembled position to form the completed splice of Figs. 2 and 3.

Fig. 6 is a top plan view of the end of a film section formed with a duplicate arrangement of tabs and perforations thereacross to provide for a double splice of the design of the splice of Figs. 1 to 5, only one of the film section ends to be spliced being shown.

Fig. 7 is a top plan view of a modified form of splice of my invention in completely interlocked and assembled position joining sections of film together.

Fig. 8 is a top plan view of the splice of Fig. 7 disconnected to show the formation of the film section ends of the modified form of splice of Fig. 7.

Fig. 9 is a top plan view of another modified form of splice embodying the principles of my invention.

Fig. 10 is a top plan view of the splice of Fig. 9 disconnected to show the formation of the film section ends of the modified form of splice of Fig. 9.

Fig. 11 is a plan view of the end of a section of sound film formed with the double splice arrangement of Fig. 6, with the tab and perforation adjacent the edge of the film having the sound track thereon, located relative to the sound track in accordance with a feature of the invention.

Fig. 12 is a plan view similar to Fig. 11, but showing a modified arrangement and location of a tab and perforation relative to the sound track of the film section.

Fig. 13 is a top plan view of a modified form of splice of my invention embodying film section ends of dissimilar shapes, the splice being shown in assembled position.

Fig. 14 is a top plan view of the splice of Fig. 13 disconnected and disassembled.

Fig. 15 is a top plan view of a further modified form of splice.

Fig. 16 is a top plan view of the splice of Fig. 15, disconnected and disassembled.

A film splice of my present invention is basically characterized by the fact that the splice is formed by first shaping and perforating the ends of the film sections to be connected and joined together, to provide an arrangement of tabs and lips and of tension and restraining edges which are formed from the material of the film itself, and then detachably interlocking and interengaging the tabs and lips and tension and restraining edges of one film section end with those of the other film section end to thereby form and complete the splice and securely join and connect the film section ends together to form the film sections into a continuous film. Such basic characteristic and features of a film splice of the present invention may be expressed and carried out by the formation of various designs and arrangements of the interlocking tabs and lips and interengaging edges from the material of the film ends to be joined, for interlocking to form the splice, but one possible preferred design and arrangement of the film section ends and of a splice formed by interlocking the same, is disclosed in Figs. 1 to 5 of the accompanying drawings, by way of example.

In the example of a preferred design and arrangement of the ends of film sections to be interlocked and joined together to form a splice of the invention, as illustrated in Figs. 1 to 5 of the accompanying drawings, the film sections are of the 16 mm. proportions, but it is to be understood that this form of the invention is also adapted and applicable for use with various sizes of film, including the standard and widely used 8 mm. and 35 mm. sizes of film. With the 16 mm. silent type cinema film of the example of Figs. 1 to 5, the film, referring now to Figs. 1 and 2 of the drawings, is provided with a series of spaced sprocket holes S along and adjacent each edge thereof in the usual or conventional manner, and with such size film each "picture" or so called "frame," occupies the space between opposite transversely alined pairs of the sprocket holes S of the series of sprocket holes along opposite edge portions of the film.

In forming the preferred splice of Figs. 1 to 5, referring now to Fig. 1 in particular, each end portion of the film sections or lengths R and L to be joined together, is suitably shaped or cut at its outer end to provide the centrally located end tab or tongue 10. Such end tab 10 may be formed, as in the present example, by cutting suitable bevels 11, or otherwise suitably forming the edges 11 extending inwardly from the central portion of the end edge of the film and diverging outwardly to the opposite longitudinal edges of the film. In the present example, in forming the splice for 16 mm. silent film, the tab 10 at each end of the film has its outer end located centrally between opposite transversely alined sprocket holes S of the film, and the tab has a length or a depth approximating half the distance between adjacent sprocket holes, so that only approximately one-half (½) of a "frame" is utilized in forming each film end tab 10. This is clearly indicated in Fig. 1 by the dotted outline of the portion of the end of each film section which has been cut away to form the tab 10 with its outwardly diverging opposite edges 11 terminating spaced inwardly from the central, outer end of the tab 10 at points approximately midway between adjacent spaced sprocket holes S. Within the remaining portion of the end "picture frame" from which a tab 10 is formed, a perforation 12 is provided through the body of the film, in the form of a slot disposed transversely of the film, and such perforation or slot is so shaped along its outer transverse edge as to provide an inwardly extended lip 14 disposed between tension edges 15 formed at the opposite forward end portions thereof by edges of the perforation or slot 12. The inner, outwardly facing transverse edge of the perforation or slot 12, provides the outer edge of a lip 16 formed from the body of the film by the perforation 12, which lip is disposed or located between restraining edges 17 formed by the inner edge portions of the opposite ends of the perforation or slot 12. The lip 16 is thus located opposite and generally parallel to, but spaced inwardly across the slot or perforation 12 from, the forwardly located and rearwardly disposed lip 14 formed by the forward transverse edge of the perforation or slot 12. Thus, the film end tab 10 and the perforation or slot 12 forming the lips 14 and 16 and edges 15 and 17 at opposite ends thereof, respectively, are in the present example all located in the space between opposite alined pairs of adjacent sprocket holes S so that only one "picture frame" is utilized or required in preparing and forming the end of the film section to be spliced.

The ends of the film sections to be spliced are, in the example hereof, identically formed and shaped to provide the outer end central tab or tongue 10 and the transversely disposed lips 14 and 16, located between the opposite end tension edges 15 and the opposite end restraining edges 17, respectively, as will be clear by reference to Fig. 1 of the drawings. However, attention is here directed to the fact that my invention is not limited to identically shaping and forming the film section ends to be spliced, as the invention contemplates and includes the formation of the film section ends to be spliced of dissimilar shapes and arrangements for interlocking and interengaging to form a splice embodying and in accordance with the principles and features of the invention. For example, referring to Figs. 13 and 14, the invention includes dissimilarly shaping and forming the film section ends R and L, by which the bevel edges 11 and the tab 10 of the film section L are eliminated, and a straight cut 11' is made across the film section L to form a square end therefor. With film section L thus formed and shaped, the perforation or slot 12' in the film section R may be formed narrower than shown in the form of Fig. 1, and lip 16' is curved opposite to the curvature of the lip 14, although the lip 16' may, if desired, be curved in either direction. The film section ends R and L thus dissimilarly formed and shaped as explained above, are interlocked into splice forming and film section joining relation in a manner which will be described hereinafter.

The shaping and the perforating of the ends of the film sections L and R to be spliced together as above described, may be carried out and performed in any desired manner and by any suitable operation, either by the use of hand cutting tools, or by an apparatus designed for the purpose. However, in order to obtain accuracy and uniformity as well as speed of operation, in the shaping and forming of the ends of the film sections, it is preferable to shape and form such ends by an apparatus designed for the purpose.

With the preferred form of splice of Figs. 1 to 5, after the steps of shaping and forming the ends of the film sections R and L, into the form and shape of Fig. 1, have been completed, the film sections may then be spliced together by interlocking such formed and shaped ends. The steps of interlocking and assembling the formed and shaped film section ends may be performed by manual manipulation in accordance with the procedure or method of my present invention, or may be performed and carried out mechanically by suitable apparatus.

When the shaped and formed ends of the film sections R and L of the form of Fig. 1, are to be manually interlocked and assembled to form the splice connecting the film sections together, the end of one film section is first placed over or overlapped onto the end of the other film section with the slots or perforations 12 of the film sections in substantial alinement. Preferably, although not so limited, the end of film section R is placed over or overlapped onto the end of film section L with the lip 14 of film section R disposed adjacent to but at the inner side of the lip 14 of film section L. Preparatory to placing the film sections R and L in such initially overlapped position, the section R is held between the thumb and forefinger of the right hand and section L is held between the thumb and forefinger of the left hand, with only the film section end tips (area between the end of the tab 10 and the lip 14 projecting beyond the thumb nails. With the film section ends so held between the thumbs and forefingers, referring now to Fig. 4 of the drawings, the tip of film section R is slipped under the thumb of the left hand with sufficient lap over film section L to superimpose the perforations 12, and the left hand thumb is pressed down onto the tip 10—14 of film section R, while the tip portion 10—14 of the film section L held in the left hand is lifted slightly with the right index finger, while pulling or drawing the film sections R and L longitudinally apart or away from each other in an outward direction, with the result that the lips 14 become hooked over each other to the position as clearly illustrated in Fig. 4 of the drawings. The arrows in Fig. 4, indicate the outward direction of movement of the film sections to cause the overlapping or hooking together of the lips 14. This relative movement of the film sections to hook the lips 14 also guides the film ends into tension bearing contact with each other along the tension edges 15 formed by the slots 12 of each of the film sections.

The initial interlocking of the ends of the film sections R and L into the position of Fig. 4, is then followed by the steps of interlocking the end tabs 10 of the film sections through the slots 12 to finally assemble and complete the splice. Referring now to Fig. 5 of the drawings, the initially interlocked ends of the film sections are both gripped together with and between the thumb and forefinger of the left hand, and the film section end R is pulled downwardly over the tip of the left forefinger so that the end tab 10 of film section L is pushed up through the perforation 12 of the film section R, as shown in Fig. 5, so as to lap over the lip 16 of film section R. After this step, the hands are shifted to place the thumb nail of the right hand about midway between the end of tab 10 and lip 14 on the end of film section R, while the left hand is moved to pull film section L upward to force the end tab 10R down through the perforation or slot 12 of film section L. During these manipulations of the final interlocking of the film section ends together, a slight tension should be maintained on the film sections and the film sections should be maintained in longitudinal alinement throughout the interlocking operations. The arrows in Fig. 5 indicate the directions of the forces and of the resulting movements of the film sections during this final interlocking operation.

Due to the flexible character of the material of the film sections, the flexing or bending of the film sections to carry out this interlocking may be performed without breaking or fracturing the material of the film, so that the end tabs 10, in effect, are flexed and snap through the slots 12 into their final interlocked and assembled positions. During the final interlocking of the end tabs 10, the overlapped and interlocked lips 14 of the film section ends remain in the position as shown in Fig. 4 of the drawings. Upon the completion of the interlocking of the end tabs 10 of the film section ends as above described, the film section ends are then in their final interlocked and completed splice forming relation and position as particularly shown in Fig. 3 of the accompanying drawings, which is a vertical, longitudinal section through the completed splice of which Fig. 2 is a plan view.

In the completed splice, referring to Fig. 3, due to the characteristics of the material of which the film is formed, the end tabs 10 and the lips 14 inherently are constrained to lie against or substantially adjacent to the film surfaces in operation and use of the film, so that the completed splice presents no projecting edges that will catch upon or engage a film gate when the spliced film is run through a projecting apparatus in either direction. It is to be further noted that, due to the construction and arrangement of the splice forming ends of the film sections, the interlocked elements of the splice are equally distributed at opposite sides of the film, so that there is less eccentric loading effect than is normally developed with those types of splices or film section connecting joints in which the film ends are entirely in offset relation when overlapped to form the connecting joint.

The completed splice of the form of Figs. 1 to 5, provides a firm and secure connection for the film sections R and L, with little play or relative movement possible between the joined sections. When the spliced film is loaded in tension, the tension edges 15 provided by the slots or perforations 12, are interengaged and no relative movement between the film section ends in a longitudinal direction away from each other is possible, while the interengaged restraining edges 17 prevent relative longitudinal movement between the film sections in the opposite direction, that is, a direction toward each other. Relative movements between the film sections in transverse or lateral directions is prevented by the interengaged edges formed by the slots and by the interlocked lips 14 and end tabs 10. The forming and shaping of each film section end so that the end tab 10 and the perforation or slot 12 thereof, are located within the space of one "picture frame," results in a completed splice, referring now to Fig. 2 of the drawings, which occupies a space that does not exceed the width of a "picture frame," so that in projection the duration of the image of the splice projected onto the screen is too short to be noticeable or objectionable. Although the splice, as shown in Fig. 2 of the drawings, occupies only one complete "picture frame" between opposite pairs of adjacent sprocket holes S, yet if desired, the splice may be located a half space either way longitudinally of the film, so that in projection the image of only a portion of the splice will first flash onto the lower portion of the screen and will then be followed by a flash of the image of the splice on the upper portion of the screen.

A splice embodying the present invention, such as the form of splice of Figs. 1 to 5, is detachably interlocked and assembled into the final or completed splice, so that the splice can be readily and quickly disassembled to disconnect the film sections, by reversing the herein above described interlocking and assembling manipulations, so as to push or force the film section end tabs 10 back through the perforations or slots 12, whereupon the lips 14 may be unhooked or disengaged to complete the disassembly of the splice and disconnection of the film sections R and L. The disassembly of the splice and the disconnection of the film sections is performed without damage or injury to the film or to the shaped and formed splice forming ends of the film sections, so that such sections may again be readily interlocked and assembled to form a splice in connecting these and other film sections together as desired.

I have found from actual experience in the operation and use of 16 mm. film spliced in accordance with the form of the invention of Figs. 1 to 5, that the shaped and formed ends of the film sections can be manually manipulated into interlocked and completely assembled splice forming relation in a period of time of from three (3) to seven (7) seconds, or on an average of approximately five (5) seconds of time to interlock and assemble a splice. I have also found that the film section ends can be shaped and formed by the use of suitable apparatus, including positioning the film ends in the apparatus, in a period of time of approximately ten (10) seconds, so that the complete operation of forming and shaping the film ends and of interlocking and assembling such shaped and formed film section ends into the completed splice, can be carried out in a total period of time of approximately fifteen (15) seconds.

With respect to the formation of a splice of the type of Figs. 13 and 14, in which the film section ends are dissimilarly formed and shaped, in a manner as hereinbefore referred to and described, with the end of film section R remaining substantially as shown in Fig. 1, while the end of film section L has the tab 10 eliminated and a straight edge 11' formed across the end of the section, such film section ends thus formed, are interlocked and assembled into the completed splice by overlapping and interlocking the two lips 14 as described in connection with Figs. 1 to 5, and forcing the tab 10 of section R through the slot of section L. Thus, the only interlocking in this form of splice may be that obtained by cooperation of the tab 10 and edges 11 thereof of film section R, with the lip 16 and restraining edges 17 formed by the slot 12 on the film section L. If, as previously mentioned, the edge of lip 16' of film section R were curved toward the film end or opposite to the curvature of edge 14, then this curved edge 16' could be interlocked over the straight cut end of film section L as shown in Fig. 13. The invention further contemplates and includes an arrangement such as disclosed in Figs. 15 and 16, in which both film sections are provided with straight cut ends and each section has a perforation of "hour glass" shape to provide lips 14' and 16' curved in opposite directions inwardly across the perforation, toward but spaced apart from each other, in order to permit of complete interlocking.

With the larger or wider sizes of film, such for example as the 35 mm. sizes of film, a double or twin splice of the form of Figs. 1 to 5, may be employed, and I have illustrated an example of such double form of splice in Fig. 6 of the accompanying drawings. In this double form of splice the film end is provided with end tabs 10 formed at spaced locations across the end edge of the film section and a slot or perforation 12 is provided through the film section for each end tab 10 in an exactly similar relationship to the end tab as employed in the single form of the splice which has been illustrated and described in detail in connection with Figs. 1 to 5. In Fig. 6 of the drawings only one film section end is shown, but it is understood, of course, that the end of the film section to be connected thereto, will be similarly formed in all respects. The operation of interlocking and assembling such double splice form is similar to that described in connection with the single splice of Figs. 1 to 5. Preferably, in assembling the double splice by hand manipulation, one splice is first interlocked and then the other splice is similarly interlocked to thus form and complete the double splice. If desired, or found expedient, such a double splice may be applied to other sizes of film, including the smaller sizes such as the 16 mm. or even the 8 mm. With film in process, as distinguished from completed film for projection, the double or multiple form of splice may be found desirable in order to give a stronger and more secure form of splice in view of the condition of the film material during processing. While the example of Fig. 6, discloses a double or twin splice, it is to be understood that the film section ends may be shaped and formed to provide for any desired number of tabs and perforations for interlocking to form a multiplicity of splices across the width of the film.

The unscraped type of splice of my invention is also of particular utility and advantage in splicing sound film, since the ends of film, being unscraped, permit of forming a splice with but a small lap at point of sound track location, so that the possibility of a strong beam of light passing at edge of the splice in the positive film is practically eliminated, while in negative film, the narrowness of lap minimizes disruption of the sound track.

For example, in Fig. 11, I have more or less diagrammatically illustrated the end of a section of 35 mm. sound film V, provided with the so-called double splice of Fig. 6, arranged relative to the sound track T of the film so that the perforation 12t adjacent the sound track T has its outer end at the inner edge of the sound track, and the outer edge 11t of tab 10t cuts across and is partially formed by the severed sound track. By this arrangement the sound film V can be spliced with only a narrow lap at the sound track.

In Fig. 12 a modified arrangement of the double splice for the sound film V is shown, in which the perforations 12" are so located on the film that the inner sides of their outer ends are cut away by and open into the sprocket holes S of the film respectively adjacent thereto, with the result that the perforation 12" adjacent the sound track T, cuts completely across the sound track. Similarly, the tab 10" at the sound track edge of the film V, cuts completely across the sound track T. With the arrangement of Fig. 12, when the sound film section V is spliced to a similarly formed end of an adjacent section of sound film, three narrow laps are formed at the sound track.

The basic characteristics and features of the film splice of the invention by which the ends of the film sections to be spliced are provided with interlocking elements, such as tabs or tongues and interengaging tension and restraining edges, as exemplified by the preferred form of Figs. 1 to 5, may, however, be expressed by other arrangements and shapings of the ends of the film sections to be spliced. Such a possible modified form of splice is disclosed in Figs. 7 and 8 of the drawings, in which, referring particularly to Fig. 8, the end of one film section R' is formed with the transversely disposed tab or tongue 10a disposed at and across one side of the longitudinal axis of the film section, while two longitudinally disposed and transversely spaced slots or perforations 12a and 12b are formed through the end portion of the film section R' at the opposite side of the longitudinal axis of the film section from that in which the tongue 10a is formed. The inner ends of the slots 12a and 12b provide the restraining edges 17a and the forward ends of such slots provide the tension edges 15a.

The end of the film section L' to be joined or spliced to the film section R', is formed and shaped in a manner similar to that above described for the end of the film section R', except that, the slots or perforations 12a and 12b and the tab or tongue 10a are disposed and formed on opposite sides, of the longitudinal axis of the film section from the sides, respectively, of the axis of the film section R' at which the slots 12a and 12b and the tongue or tab 10a are formed on the section R', as will be clear by reference to Fig. 8 of the drawings.

The shaped and formed ends of the film sections R' and L' of Fig. 8 are assembled and interlocked into the completed splice as shown in Fig. 7 by overlapping the end of film section R' onto the end of film section L' initially in laterally offset position with the tongue 10a of section R' on the upper side of section L', and the tongue 10a of section L' at the under side of section R'. The ends of the tongues 10a, when in such initially overlapped position, are disposed at the outer side edges and in line with the slots 12a, respectively, of the opposite film sections. Thus positioned, the overlapped ends are then moved laterally or transversely of the film sections, inwardly toward each other in opposite directions, as indicated by the arrows on Fig. 7, while the tongue 10a of film section R' is passed downwardly through slot 12a and upwardly through slot 12b of film section L' and the tongue 10a of section L', which is disposed at the under side of the end of section R', is passed upwardly through the slot 12a and downwardly through the slot 12b, of film section R', thus completing the interlocking and assembly of the film section ends into the completed splice as shown in Fig. 7, of the drawings. Thus, the film sections R' and L' are firmly and securely detachably spliced together by interlocking the tongue of each section end with the slots of the other section end. Relative longitudinal movement in either direction is prevented by the tension edges 15a and restraining edges 17a, while lateral or relative transverse movement in any direction is substantially prevented when the film is under tension by the opposite tongues 10a interlocked in the pairs of slots 12a and 12b.

Another modified form of the splice of the invention, which is of the general type of the preferred form of Figs. 1 to 5, in that longitudinally disposed end tabs and transversely disposed slots or perforations are provided on the ends of the film sections to be spliced, is disclosed in Figs. 9 and 10 of the accompanying drawings. In this modified form of splice the ends of the film sections R'' and L'' are similarly formed and shaped to provide each film section with a centrally and longitudinally disposed end tab 10' and a perforation 12' through the body of the film disposed transversely thereof and spaced inwardly from the end of the film section. In this instance the film sections are of the 16 mm. type and each perforation 12' is disposed within the space occupied by the "picture frame" at the end of the film section.

The end tab 10' of each film section, referring now particularly to Fig. 10 of the drawings, is in the form of an "arrow head" which terminates in the outer end, centrally located lip 20. Each tab 10' at its base is transversely undercut to form the opposite laterally or transversely extending lips 21. Each perforation 12' is shaped to provide an edge 22 at its forward or outer side thereof and a curved substantially semi-circular edge 23 forming the inner and opposite outer side edges of the perforation 12'.

With the ends of the film sections R'' and L'' similarly formed and shaped as above described, the ends are interlocked and assembled to form the splice, by overlapping the end of film section R'' onto the end of film section L'', and then flexing and forcing the opposite side lips 21 of tab 10' of film section R'' downwardly through perforation 12' of a film section L'', with the lip 20 of tab 10' engaged against the upper side or surface of film section L'' adjacent the curved inner edge of perforation 12' of section L''. The tab 10' of film section L'' is located at the under side of film section R'', and the lips 21 at the opposite inner sides of the tab 10' of section L'', are flexed and forced upwardly through the perforation 12' of film section R'', with the outer end lip 20 of tab 10' remaining in engagement with the under side of section R'' adjacent the inner curved edge of perforation 12' of the section R''. Thus, the end tab 10' of each film section is interlocked with the other film section by means of the lips 20 and 21 engaged over and interlocked with the opposite sides of the film section through the perforation 12'. The completed and assembled splice of the form of Fig. 10 is disclosed in plan view in Fig. 9 of the accompanying drawings, and, as with the forms of the splice previously described herein, this modified form of Figs. 9 and 10 provides a firm and secure splice joining and connecting the film sections together, while being readily detachable, and also presenting the same general basic characteristics, attributes and features as embodied in and presented by such other forms of splices of the invention.

It is also evident that various other designs, arrangements, modifications, combinations and constructions might be resorted to without departing from the broad spirit and scope of my invention, and hence, I do not desire or intend to limit and restrict my invention in all respects to the specific disclosures of the several embodiments thereof illustrated and described herein by way of example.

What I claim is:

1. In combination, sections of film having ends thereof spliced together to connect the film sections into a continuous length of film, the spliced ends of the film sections being each shaped to include a tab portion formed from the body of the film and a perforation through the body of the film adjacent the tab portion, the film section end portions being overlapped and the tab portion of each film section being extended through the perforation of the other film section to interlock the film sections together.

2. In combination, sections of film having ends thereof spliced together to join the film sections into a continuous length of film, the spliced end portions of the film sections being each shaped to include elements formed from the body of the film, the spliced end portions of the film sections being overlapped, and the elements of each film section being interengaged with the elements of the other film section to lock the film section ends together in spliced relation against relative movements in any direction.

3. In combination, sections of film having ends thereof spliced together, the spliced end portion of each film section being shaped to provide a tab formed from the body of the film and a perforation through the body of the film adjacent the tab, the end portions of the film sections being overlapped and the tab of each film section being extended through the perforation of the other film section and the edges of the perforations through the film sections being interengaged to lock the film sections against relative longitudinal movement in a direction outwardly away from each other.

4. In combination, sections of film having ends thereof spliced together to connect the film sections into a continuous length of film, the spliced ends of the film sections being each shaped to provide an end tab and the body of each film section being formed with a slot therethrough disposed transversely of the longitudinal axis of the end tab adjacent the inner end of the tab, and the film section ends being overlapped with the end tab of each film section extended through the perforation in the other film section and with an edge of the slot of each film section interengaged with an adjacent edge of the slot of the other film section to secure the film sections together against longitudinal movement in outward directions relative to each other.

5. In combination, sections of film having ends thereof spliced together to connect the film sections into a continuous length of film, the spliced ends of the film sections being each shaped to provide a longitudinally and outwardly disposed end tab formed from the body of the film and a slot through the body of the film disposed transversely thereof adjacent the inner end of the tab, the film section ends being overlapped with the end tab of each film section extended through the slot of the other film section and with the forward edge portions of the slots of the film sections interengaged to maintain the sections against relative longitudinal movement in one direction, and the opposite forward edge portions of each end tab being engaged against the adjacent portions of the inner edge of the slot through the other film section to maintain the film sections against relative longitudinal movement in the opposite direction.

6. In combination, sections of film having ends thereof spliced together to join the film sections into a continuous length of film, the spliced ends of the film sections being each shaped to provide a longitudinally disposed end tab formed from the body of the film and a slot through the body of the film disposed transversely thereof adjacent the inner end of the tab with the forward edge portion of each slot formed to provide an inwardly extending lip, the film section ends being overlapped with the end tab of each film section extended through the slot of the other film section and with the inwardly extended lip formed by the forward edge portion of each slot engaged under the inwardly extended lip formed by the forward edge portion of the slot through the other film section with the adjacent edge portions at opposite ends of the slots engaged, and the opposite outer edges of each end tab being engaged with the inner edge portion of the slot of the other film section.

7. In combination, sections of film having ends thereof spliced together, the spliced ends of the film sections being each shaped to form an outwardly extending longitudinally disposed end tab decreasing in width outwardly with the outer end of the tab providing a lip portion and the opposite side edges of the tab undercut at the inner or base end thereof to provide opposite outwardly extended lip portions, each film section end being provided with an opening through the body thereof spaced inwardly from but adjacent to the end tab, the film section ends being overlapped with the opposite outwardly extended lip portions at the inner end of the tab of each film section end being extended through the perforation of the other film section in engagement with the opposite side surface of the film section and with the lip formed at the outer end of each tab engaged over the edge portion of the perforation at the side of the film section on which such tab is located.

8. In combination, sections of film having ends thereof spliced together to connect the film sections, the spliced ends of the film sections being each shaped to provide a transversely disposed tab at the end of the section extending inwardly across the section from the outer edge portion of the section and terminating in a free end portion intermediate the width of the section, each film section being provided with spaced substantially parallel slots formed through the body of the film section disposed longitudinally thereof in the end portion of the film section substantially opposite the end tab, the film section ends being overlapped with the transversely disposed tab of each film section being extended through the slots of the other film section to interlock and splice the film sections together.

9. A length of film composed of sections joined together at adjacent ends, said sections being each shaped to provide tension edges and opposed edges spaced therefrom, the tension edges of each section being engaged in interlocked relation with the tension edges of the other section to constrain said joined sections against relative longitudinal movement away from each other, and the extremities of the joined ends of said sections being each shaped to provide edges for engagement by the opposed edges of the other section to constrain the sections against relative longitudinal movement toward each other.

10. A length of film composed of sections joined together at adjacent ends with the joined ends overlapped, said sections being each perforated to provide tension edges in engagement with the tension edges provided by the other section, the portions of the sections adjacent said tension edges being interlocked to maintain said edges in engagement to constrain the sections against relative longitudinal movement away from each other, and the extremities of the overlapped joined ends of said sections being each shaped to provide edges engaged by edges formed in the other section to constrain said sections against relative longitudinal movement toward each other to thereby maintain said tension edges against displacement from interlocked engagement.

11. A length of film composed of sections joined together at adjacent ends with the joined ends overlapped, said sections being each perforated to provide tension edges in engagement with the tension edges provided by the other section, the portions of the sections adjacent said tension edges being interlocked to maintain said edges in engagement to constrain the sections against relative longitudinal movement away from each other, the extremities of the overlapped joined ends of said sections each providing edges engaged by edges provided by the other section to constrain said sections against relative longitudinal movement toward each other, and a portion of the extremity of the joined end of each section being engaged through the other section to thereby constrain the overlapped joined ends of the sections in position at the adjacent side surfaces, respectively, of the film against displacement laterally outwardly therefrom.

12. A length of film composed of sections joined together at adjacent ends with the joined ends overlapped, each of said sections being formed with transversely disposed perforations spaced apart transversely of the section to provide tension edges in engagement with the tension edges, respectively, provided by the perforations in the other section, the portions of each section adjacent the tension edges thereof being interlocked with the portions of the other section respectively adjacent the tension edges of such other section to constrain the sections against relative longitudinal movement away from each other, the overlapped joined ends of said sections being each also shaped to provide edges engaged respectively by edges formed in the other section to constrain said sections against relative longitudinal movement toward each other to thereby maintain said tension edges against displacement from interlocked engagement, and portions of the overlapped joined end of each section being engaged through the other section to thereby constrain the overlapped joined ends of the sections in position at the adjacent side surfaces, respectively, of the film against outward displacement therefrom.

13. A length of film composed of sections joined together at adjacent ends with the joined ends overlapped, each of said sections being formed with similar transversely disposed perforations spaced apart transversely of the section to provide tension edges in engagement with the similar tension edges respectively provided by the perforations in the other section, the portions of each section adjacent the tension edges thereof being interlocked with the portions of the other section respectively adjacent the tension edges of such other section to constrain the sections against relative longitudinal movement away from each other, the overlapped joined ends of said sections being also each similarly shaped to provide edges engaged respectively by edges formed in the other section to constrain said sections against relative longitudinal movement toward each other to thereby maintain said tension edges against displacement from interlocked engagement, and portions of the extremity of the joined end of each section being interlocked with the other section to thereby constrain the overlapped joined ends of the sections in position at the adjacent side surfaces, respectively, of the film against outward displacement therefrom.

14. A length of film composed of sections joined together at adjacent ends with the joined ends overlapped, said sections being each similarly perforated to provide tension edges in engagement with the tension edges respectively provided by the other section, the portions of the sections adjacent said tension edges being interlocked to maintain said tension edges in engagement to constrain the sections against relative longitudinal movement away from each other, the extremities of the overlapped joined ends of said sections being similarly shaped to provide edges engaged by edges provided by the other section to constrain said sections against relative longitudinal movement toward each other, and a portion of the extremity of the joined end of each section being interlocked with the other section to thereby constrain the overlapped joined ends of the sections in positions at the adjacent side surfaces, respectively, of the film against displacement laterally outwardly therefrom.

15. In combination, sections of film joined together at the adjacent ends thereof to form a continuous length of film, the joined end of each film section being shaped to provide an end portion formed from the body of the film, each section being provided with a perforation through the body of the film adjacent said shaped end portion, the joined ends of the film sections being overlapped and the shaped end portions of each film section being extended through the perforation of the other film section and the edge portions of the film provided by the perforations through the sections being interlocked to maintain the joined film sections against relative movements.

HARRY CLARK FOSTER.

REFERENCES CITED

The following references are of record in the file of this patent:

UNITED STATES PATENTS

| Number | Name | Date |
|---|---|---|
| 1,655,297 | Thornton | Jan. 3, 1928 |
| 2,318,287 | Brolin | May 4, 1943 |
| 1,727,349 | Lyman | Sept. 10, 1929 |
| 2,253,874 | Tucker et al. | Aug. 26, 1941 |
| 1,927,063 | Conn | Sept. 19, 1933 |
| 2,064,414 | Cohn et al. | Dec. 15, 1936 |
| 1,994,913 | Howell | Mar. 19, 1935 |
| 2,101,458 | Sachtleben | Dec. 7, 1937 |

FOREIGN PATENTS

| Number | Country | Date |
|---|---|---|
| 526,197 | France | Oct. 3, 1921 |